United States Patent
Mosko (10) Patent No.: US 7,492,717 B2
(45) Date of Patent: Feb. 17, 2009

(54) METHOD AND APPARATUS FOR MULTI-PATH LOAD BALANCING USING MULTIPLE METRICS

(75) Inventor: Marc E. Mosko, Santa Cruz, CA (US)

(73) Assignee: Palo Alto Research Center Incorporated, Palo Alto (*) Notice: Subject to any disclaimer, the term of this patent is extended or adjusted under 35 U.S.C. 154(b) by 590 days.

(21) Appl. No.: 11/314,663

(22) Filed: Dec. 20, 2005

(65) Prior Publication Data
US 2007/0140114 A1 Jun. 21, 2007

(51) Int. Cl.
*G01R 31/08* (2006.01)
(52) U.S. Cl. ...................................... 370/238
(58) Field of Classification Search ............... 370/229, 370/230, 255, 351, 235, 238, 241, 254
See application file for complete search history.

(56) References Cited

U.S. PATENT DOCUMENTS 6,084,858 A * 7/2000 Matthews et al. ........... 370/238
6,633,544 B1 * 10/2003 Rexford et al. .............. 370/238
6,778,496 B1 * 8/2004 Meempat et al. ............ 370/230
2002/0186665 A1 * 12/2002 Chaffee et al. .............. 370/255

* cited by examiner

*Primary Examiner*—Kwang B Yao
*Assistant Examiner*—Anh Ngoc Nguyen
(74) *Attorney, Agent, or Firm*—Park, Vaughan & Fleming LLP; Shun Yao (57) ABSTRACT

One embodiment of the present invention provides a system for facilitating multi-path load balancing at a local node in a network. During operation, the system measures a value for a metric on a local link which couples the local node to a neighboring node. In addition, the system receives from the neighboring node a neighbor path-metric value which indicates a value for the metric associated with all paths from the neighboring node to a destination node. The system then computes a "local path-metric value" for the metric associated with all paths from the local node to the destination node via the local link and the neighboring node. The system further computes a "packet-forwarding probability" corresponding to the destination node for each local link coupled to the local node, wherein the distribution of the packet-forwarding probability bears a nonlinear relation to the distribution of the local path-metric values for all the local links. The system subsequently forwards a packet destined for the destination node to one of the local links based on the computed packet-forwarding probability for that local link.

15 Claims, 4 Drawing Sheets

METHOD AND APPARATUS FOR MULTI-PATH LOAD BALANCING USING MULTIPLE METRICS

BACKGROUND

1. Field of the Invention

Embodiments of the present invention relate to techniques for routing data in a network. More specifically, embodiments of the present invention relate to a method for performing load balancing using multiple paths at a node.

2. Related Art

The ever-growing Internet traffic, combined with numerous emerging wireless applications, is placing a progressively heavier burden on network links. Load balancing is an important technique for mitigating network congestion and for removing "hot-spot" links in a network. With load balancing, a node forwards a received data packet to different output links, and hence onto multiple paths leading to the same destination.

A number of approaches are currently available for establishing multiple paths from a source to a destination by finding "link-disjoint" or "node-disjoint" paths. Finding link- or node-disjoint paths, however, introduces additional states into the network, and hence makes path maintenance much more complicated. As a result, maintaining the network states to preserve disjoint paths can be very expensive. The use of link-disjoint or node-disjoint paths is largely motivated by the concern for network reliability, because a link-disjoint or node-disjoint path can eliminate a single point of failure, such as a node failure or a link failure. However, using only link-disjoint or node-disjoint paths imposes unnecessary constraints to load balancing, because load balancing can only occur at the source node or at a node which intersects multiple paths.

Moreover, imposing link or node disjointedness is particularly burdensome to a heterogeneous network, such as a mobile ad hoc network for wireless devices. Wireless devices often have multiple network interfaces based on different technologies and protocols. For example, a given wireless device can have interfaces for IEEE 802.11 WiFi technology, Bluetooth technology, 2G or 3G cellular data-interface technology, and IEEE 802.15.4 Zigbee technology, and infrared technology. In such a heterogeneous network, imposing link-disjointedness or node-disjointedness can prevent the user from utilizing otherwise usable links.

Furthermore, in a heterogeneous network, a link may have multiple metrics, such as hop count, physical distance, bandwidth, queuing delay, and communication cost. A load-balancing scheme based on consideration of only one metric cannot efficiently achieve an optimal result.

Hence, there is a need for a method and an apparatus for performing multi-path load balancing which accommodates multiple link metrics without imposing link or node disjointedness.

SUMMARY

One embodiment of the present invention provides a system for facilitating multi-path load balancing at a local node in a network. During operation, the system measures a value for a metric on a local link which couples the local node to a neighboring node. In addition, the system receives from the neighboring node a neighbor path-metric value which indicates a value for the metric associated with all paths from the neighboring node to a destination node. The system then computes a "local path-metric value" for the metric associated with all paths from the local node to the destination node via the local link and the neighboring node. The system further computes a "packet-forwarding probability" corresponding to the destination node for each local link coupled to the local node, wherein the distribution of the packet-forwarding probability bears a nonlinear relation to the distribution of the local path-metric values for all the local links. The system subsequently forwards a packet destined for the destination node to one of the local links based on the computed packet-forwarding probability for that local link.

In one variation of this embodiment, computing the packet-forwarding probability involves computing a metric-specific path weight for paths that traverse a local link and lead to the destination node. The metric-specific path weight indicates the likelihood of the corresponding local link being chosen for forwarding packets to the destination node.

In a further variation, computing the metric-specific path weight involves computing a distribution of all the local path-metric values for the metric using the following formula:

$$pw_{ij} \leftarrow \frac{\exp(pm_{ij}/T_j)}{\sum_{k=1}^{N}\exp(pm_{kj}/T_j)};$$

wherein i denotes the index of a local link;

j denotes the index of a metric, if more than one metric is associated with a local link;

$pw_{ij}$ denotes the metric-specific path weight for metric j and for paths traversing local link i;

$pm_{ij}$ denotes the local path-metric value for metric j and for paths traversing local link i;

$T_j$ denotes a pre-determined parameter associated with metric j; and

N denotes the total number of local links.

In a further variation, if a local link has more than one metric, the pre-determined parameter $T_j$ associated with metric j has a value of 1/N, wherein N denotes the total number of local links.

In a further variation, if a local link has more than one metric, computing the packet-forwarding probability involves computing a link weight for a local link as follows:

$$w_i \leftarrow \sum_{j=1}^{M} Q_j \cdot pw_{ij};$$

wherein i denotes the index of a local link;

j denotes the index of a metric;

$w_i$ denotes the link weight for local link i;

$pw_{ij}$ denotes the metric-specific path weight for metric j and for a path traversing local link i;

$Q_j$ denotes the weight assigned to metric j for calculating the link weight; and M denotes the total number of metrics.

In a further variation, the system computes an average metric value associated with the destination node for a given metric and for all the paths which lead to the destination node and which traverse the local links, as follows: $am_j$ $$am_j \leftarrow \sum_{i=1}^{N} w_i \cdot pm_{ij};$$

wherein
  i denotes the index of a local link;
  j denotes the index of a metric;
  $am_j$ denotes the average metric value for metric j;
  $w_i$ denotes the link weight for local link i;
  $pm_{ij}$ denotes the local path-metric value for metric j and for paths traversing local link i and leading to the destination node; and
  N denotes the total number of local links.

In a further variation, the system communicates a rounded average metric value to a neighboring node.

In a further variation, the communication of the rounded average metric value to the neighboring node occurs when the current rounded average metric value differs from a corresponding previously communicated value.

In a further variation, forwarding the packet involves forwarding the packet to a local link i with a probability of $w_i$.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs).

Non-Disjoint Multi-Path Load Balancing

Figure 1:
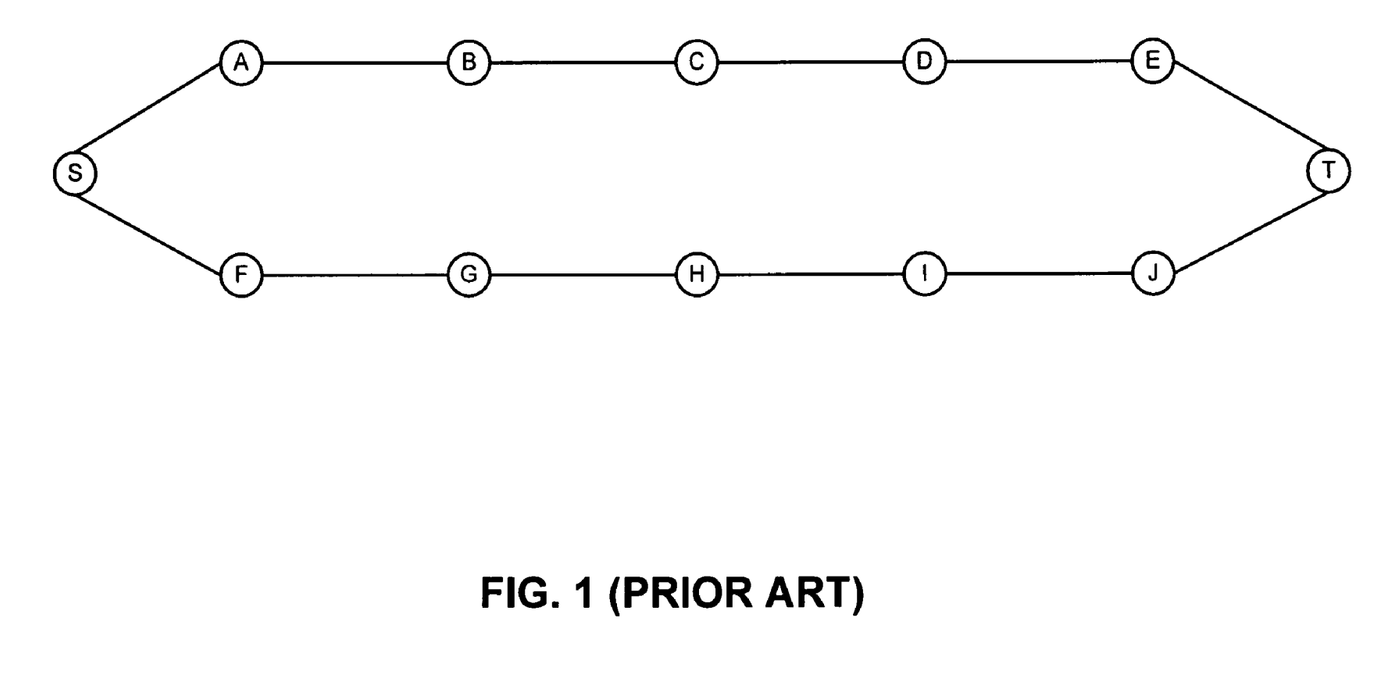
FIG. 1 illustrates an exemplary network with two disjoint paths.

FIG. 1 illustrates an exemplary network with two disjoint paths and also illustrates how to compute the corresponding network reliability. Assume that each link has an independent, equally successful packet-delivery probability, p. The end-to-end successful packet-delivery probability from the source s to the destination t through one path, such as (s, a, b, c, d, e, t) or (s, f g, h, i, j, t), is $p^6$.

If the mean lifetime (mean time between failures, MTBF) of a link is l, then the mean time between path failures for a single path is l/6, or more generally, l/k, where k is the number of path hops. Furthermore, assuming that failure occurrence is a Poisson process, and that the failure rate of a link is $\lambda=1/l$, the probability of a link failure occurring during a time interval t can be computed as: $F(t)=1-1\exp(-\lambda t)$. If random variable $L_i$ denotes the mean lifetime of a link i, the failure probability of a path including k links in series is $F_k^s(t)=\text{Prob}[\min\{L_i\}\leq t]=1-\exp(-k\cdot\lambda t)$. The failure probability of k parallel single-link paths is $F_k^p(t)=\text{Prob}[\max\{L_i\}\leq t]=(1-\exp(-\lambda t))^k$.

Hence, for a single path including six serial links, the end-to-end route failure probability is:

$$F(t)=1-\exp(-6\lambda t).$$

The mean time between failures of the route can be computed as:

$$E(t) = \int_{t=0}^{\infty} [1 - F(t)] \cdot dt$$
$$= \frac{1}{6\lambda}.$$

Similarly, for the two parallel paths shown in FIG. 1, the end-to-end route failure probability is:

$$F(t)=[1-\exp(-6\lambda t)]^2=1-2\cdot\exp(-6\lambda t)+\exp(-12\lambda t).$$

The mean time between failures of the route can be computed as:

$$E(t) = \int_{t=0}^{\infty} [1 - F(t)] \cdot dt$$
$$= \frac{2}{6\lambda} - \frac{1}{12\lambda}$$
$$= \frac{1}{4\lambda}.$$

Therefore, the mean lifetime of a multi-path route with two disjoint paths is 1.5 times the mean lifetime of a single path with six hops.

Figure 2:
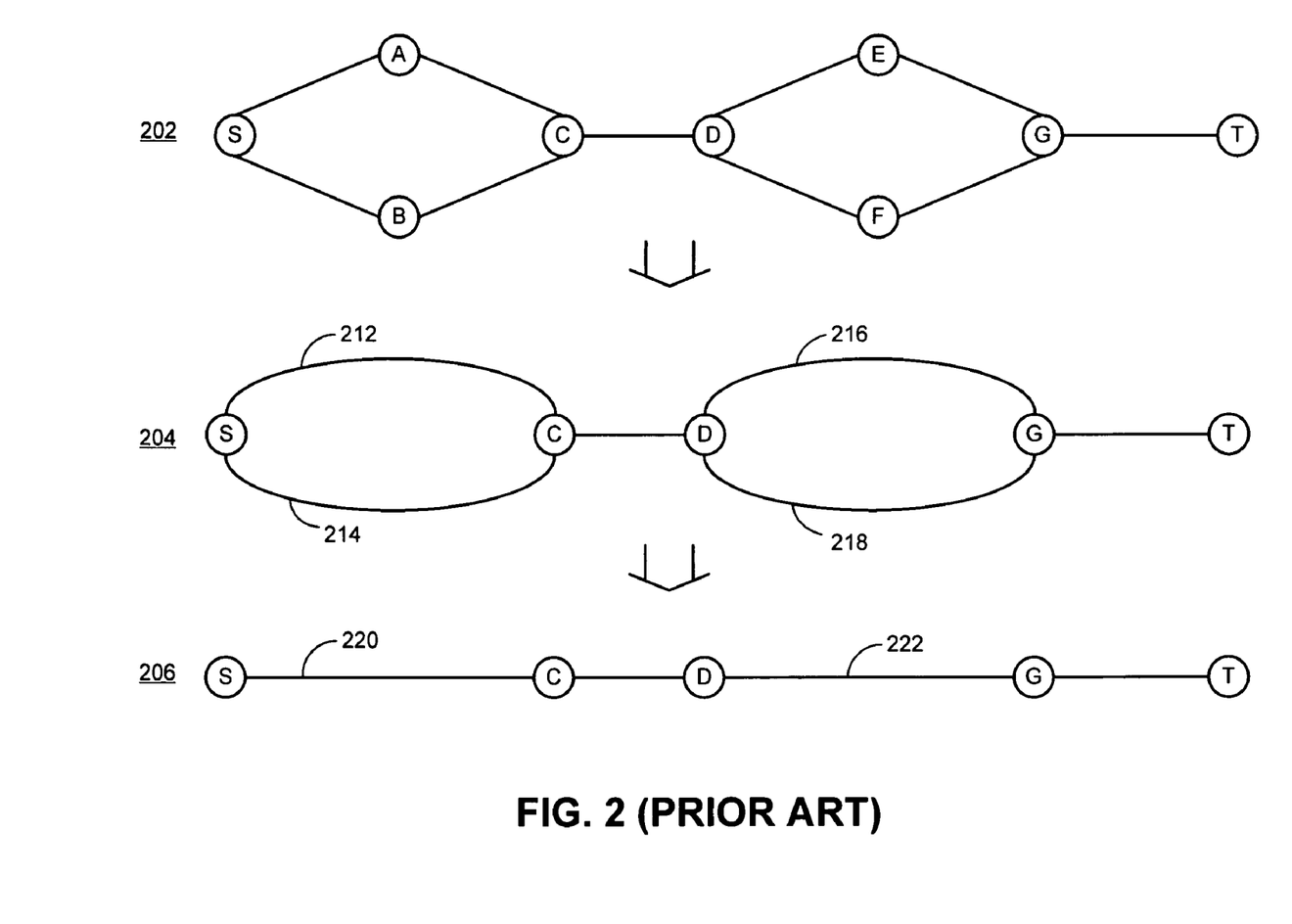
FIG. 2 illustrates an exemplary network with multiple non-disjoint paths.

FIG. 2 illustrates an exemplary network with multiple non-disjoint paths. Topology 202 represents the actual physical topology of the network. From the source node s there are four different paths leading to destination node t, namely (s, a, c, d, e, g, t), (s, a, c, d, f, g, t), (s, b, c, d, e, g, t), and (s, b, c, d, f, g, t). Links of these four paths can be combined to simplify the computation of an end-to-end route failure probability. For example, sub-path (s, a, c) can be combined into one edge 212, and (s, b, c) into one edge 214, as is shown in a logical topology 204. Similarly, sub-paths (d, e, g) and (d, f, g) can be combined into edges 216 and 218, respectively. The parallel edges in logical topology 204 can be further reduced into single edges, as is shown in logical topology 206. For example, edges 212 and 214 can be reduced to edge 220, and edges 216 and 218 can be reduced to edge 222.

The end-to-end route failure probability can be computed based on the reduction process described above. Assuming that the failure rate of a single link is $\lambda$, the end-to-end failure probability F(t) can be computed as:

$$F(t) = 1 - (\exp(-\lambda t))^2 \cdot (1 - (1 - \exp(-2\lambda t)^2)^2$$
$$= 1 - \exp(-6\lambda t) - 3\exp(-6\lambda t) + 4\exp(-8\lambda t) - \exp(-10\lambda t).$$

The mean time between failures of the route can be computed as:

$$E(t) = \int_{t=0}^{\infty} [1 - F(t)] \cdot dt$$
$$= \frac{4}{6\lambda} - \frac{4}{8\lambda} + \frac{1}{10\lambda}.$$

The mean lifetime of a multi-path route with four non-disjoint paths, as is shown in FIG. 2, is 1.6 times the mean lifetime of a single path with six hops. Note that the mean lifetime of a route with multiple non-disjoint paths as is shown in FIG. 2 can be longer than that of a route with multiple disjoint paths as is shown in FIG. 1, although the latter can consume more network resources such as physical links. Therefore, the use of multiple non-disjoint paths in load balancing can increase the successful packet-delivery probability.

Nonlinear Distribution of Metric-Specific Link Weights

Embodiments of the present invention provide a mechanism for a node with N links (and hence N neighboring nodes) to determine how to forward a packet, wherein each link can have a number of metrics. During operation, a node computes packet-forwarding probabilities for each outgoing link for packets with the same destination, and forwards a packet based on these computed probabilities. One embodiment of the present invention computes the packet-forwarding probabilities based on the weights assigned to different metrics.

Suppose, first, that each link has only one metric, such as link quality, and that a node has three successor neighbors for forwarding a packet to a destination node with link qualities {0.9, 0.8, 0.4}, respectively. The node can compute the packet-forwarding probabilities proportionally to the link qualities. For example, the corresponding packet-forwarding probabilities can be {43%, 38%, 19%}. Such a linear load-balancing scheme can be problematic, because forwarding 19% of the traffic to the link with the poorest quality is often undesirable.

According to embodiments of the present invention, a preferable approach to forwarding packets is to distribute the traffic nonlinearly to the links with regard to the link quality (or any given metric), so that good-quality links receive more traffic, and poor-quality links receive less, in comparison with the linear distribution. For example, a system can compute a weight, $b_{ij}$, given to an outgoing link j based on a nonlinear distribution of a metric j among all the links, as follows:

$$b_{i,j} = \frac{\exp(x_{i,j}/T_j)}{\sum_{k=1}^{N} \exp(x_{k,j}/T_j)};$$

wherein i is the outgoing link index; j is the metric index, which in this case is fixed because there is only one metric; N is the total number of outgoing links; $x_{ij}$ is the value for metric j on outgoing link i, and $T_j$ is a pre-determined parameter associated with metric j. Parameter T controls the spread of the distribution.

Figure 3:
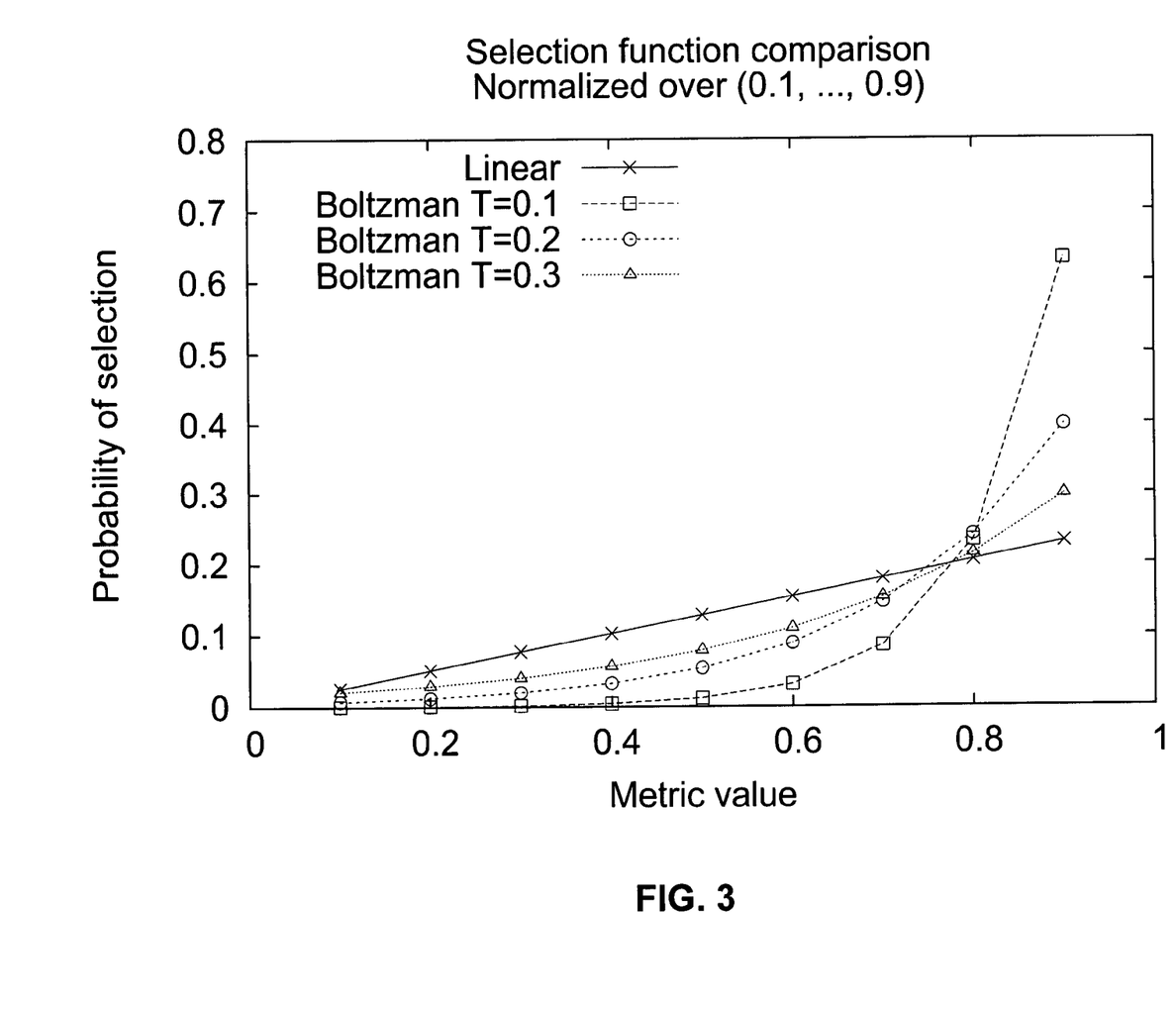
FIG. 3 illustrates exemplary nonlinear distributions of the weights given to outgoing links based on the link metric values in accordance with one embodiment of the present invention.

FIG. 3 illustrates exemplary nonlinear distributions of link weights as described above with the parameter T set to be {0.1, 0.2, 0.3} for a metric with choice values of {0.1, 0.2, 0.3, 0.4, 0.5, 0.6, 0.7, 0.8, 0.9}. FIG. 3 also shows a normalized linear distribution. In the T=0.1 series, the weight (which corresponds to the probability of selection in this example) given to a link with a metric value of 0.9 is 63%, and the weight given to a link with a metric value of 0.8 is 23%. As the T parameter increases, the selectivity decreases, and the distribution curve approaches the linear curve. In one embodiment, the T parameter is chosen to be 1/N, which implies that the more outgoing links a node has, the more biased the packet forwarding becomes towards links with better metrics.

Multi-Path Routing with Multiple Metrics

One embodiment of the present invention facilitates a multi-path routing scheme based on multiple link metrics. The system uses distance vector routing as the underlying routing mechanism. In conventional distance vector routing, each node maintains a table that indicates the best known metric value (e.g., the shortest distance or the minimum hop count) to each destination, and which outgoing link to use to reach the destination. Each node exchanges information with the neighbors to update these tables. Each node is also expected to measure and know the local metric of each outgoing link to the neighboring nodes. Based on the tables received from the neighbors, and by computing the total metric value to the destination, a node can determine which link provides the best metric-value path to the destination.

Conventional distance vector routing does not directly apply to multi-path routing with multiple metrics. Embodiments of the present invention provide a system that performs multi-path routing while accommodating multiple metrics. In one embodiment, a node computes the packet-forwarding probability for each outgoing link for packets with the same destination based on the metric information reported by the neighbors.

Assume that a node has N outgoing links which lead to N neighbors, and each link has M metrics. Further, let $rm_{ij}$ denote the neighbor path-metric value, which is aggregate value of metric j for all the paths to a given destination via link i, as reported by neighboring node i; and let $lm_{ij}$ denote the locally measured value of metric j for link i. The node then computes a local path-metric value, $pm_{ij}$, which is the aggregate value of metric j associated with all paths from the local node to the destination via link i and neighbor i, as follows:

$$pm_{ij} \leftarrow f_j(lm_{ij}, rm_{ij}).$$

$f_j(\cdot)$ is a metric-specific combination function for metric j. For example, if metric j is hop count or distance, $f_j(\cdot)$ is an addition function.

Next, the node computes a metric-specific normalized path weight, $pw_{ij}$, which is the weight given to all the paths traversing an outgoing link i with regard to metric j, based on a nonlinear distribution of the local path-metric values, as follows:

$$pw_{ij} \leftarrow \frac{\exp(pm_{ij}/T_j)}{\sum_{k=1}^{N} \exp(pm_{kj}/T_j)}.$$

In one embodiment, the system assigns weights, denoted as $Q_j$, to different metrics, wherein $\Sigma_j Q_j = 1$. A metric's weight $Q_j$ indicates the importance of this metric in the computation of packet-forwarding probabilities. The node can then compute the final link weight $w_i$, which indicates the likelihood of a link i being selected for forwarding a packet for the given destination, as follows:

$$w_i \leftarrow \sum_{j=1}^{M} Q_j \cdot pw_{ij};$$

wherein M is the total number of metrics. Furthermore, because $\Sigma_j Q_j=1$ and $\Sigma_i pw_{ij}=1$, therefore, $\Sigma_i w_i=1$. As a result, link weight $w_i$ can be used directly as the packet-forwarding probability.

In one embodiment of the present invention, the node forwards a packet destined to the destination to an outgoing link i with a probability $w_i$. For example, the node can generate a random number r∈(0, 1) and scans the cumulative density function of $w_i$ to find the first link i whose weight $w_i$ is less than or equal to r.

In another embodiment, the node can create a vector with a number of elements. Each element indicates an outgoing link, and the number of elements corresponding to each outgoing link is allocated based on the link weight $w_i$. For instance, the node can populate a vector with 100 elements, each element's value being an outgoing link's index. Suppose that there are three outgoing links, labeled as {1, 2, 3 }, respectively, and that the corresponding link weights are {20%, 30%, 50%}. The node can then populate the vector with 20 "1"s, 30 "2"s, and 50 "3"s, in a random order. When packets arrive, the node fetches one vector element at a time in a round-robin fashion, and forwards each packet based on the value of a vector element.

Note that the link-weight computation process described above is for one destination only. To obtain a complete set of routing information for every possible destination, a node ideally performs the aforementioned process for every other node in the network.

Advertising Path-Metric Values

For the routing method described above to function properly, a node also advertises the path-metric values for each metric and each destination to the neighbors. In one embodiment, the node computes an average metric value $am_j$ as follows:

$$am_j \leftarrow \sum_{i=1}^{N} w_i \cdot pm_{ij}.$$

The node can advertise $am_j$ for all the metrics to the neighbors. For a neighboring node on the receiving end, $am_j$ corresponds to $rm_{ij}$, wherein i indicates the link on which the advertised $am_j$ is received. After the initial advertisement of $am_j$ for all the metrics, the node can update the advertisement when the value of one or more $am_j$ changes.

In another embodiment, instead of $am_j$, the node can advertise a rounded average metric value $ram_j$:

$ram_j \leftarrow \text{Round}(am_j, sig_j);$ wherein significance $sig_j$ denotes the range in which the value of $am_j$ can change without changing the value of $ram_j$. Advertising a rounded average metric value helps the network converge more quickly and remain stable.

Figure 4:
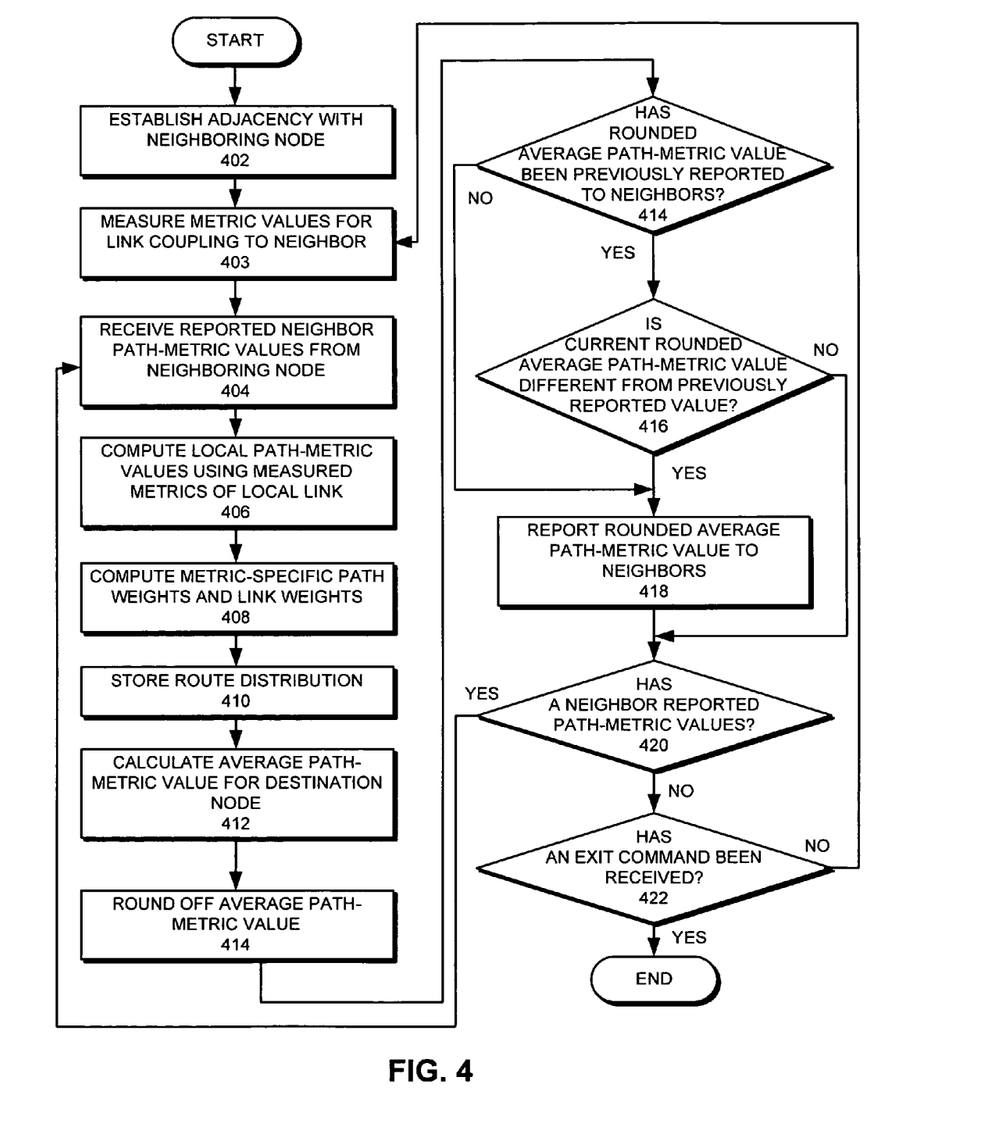
FIG. 4 presents a flow chart illustrating a process for performing multi-path load balancing in accordance with one embodiment of the present invention.

FIG. 4 presents a flow chart illustrating a process for performing multi-path load balancing in accordance with one embodiment of the present invention. During operation, the system first establishes adjacency with a neighboring node (step 402), and measures the metric values for the link coupled to the neighboring node (step 403). The system then receives reported neighbor path-metric values from the neighboring node (step 404), and computes local path-metric values using measured metrics of the local link (step 406).

Next, the system computes metric-specific path weights and link weights (step 408), and stores the route distribution (step 410). In addition, the system calculates an average path-metric values for the destination node (step 412), and rounds off the average path-metric value (step 414). The system then determines whether the rounded average path-metric value has been previously reported to the neighbors (step 414). If not, the system reports the rounded average path-metric value to the neighbors (step 418). Otherwise, the system determines whether the current rounded average path-metric value differs from the previously reported value (step 416), and, if so, the system reports the rounded average path-metric value to the neighbors (step 418).

If the current rounded average path-metric value is not different from the previously reported value, the system further determines whether a neighbor has reported any path-metric values (step 420). If so, the system receives the reported value (step 404). If no updates have been received from the neighbors, the system can exit if an exit command has been received (step 422), or otherwise continues to measure the metric values of the link coupling to the neighboring node (step 403).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating multi-path load balancing at a local node in a network, the method comprising:

measuring a value for a metric on a local link which couples the local node to a neighboring node;

receiving from the neighboring node a neighbor path-metric value which indicates a value for the metric associated with paths from the neighboring node to a destination node;

computing a local path-metric value for the metric associated with paths from the local node to the destination node via the local link and the neighboring node;

computing a packet-forwarding probability corresponding to the destination node for each local link coupled to the local node, wherein the distribution of the packet-forwarding probability bears a nonlinear relation to the distribution of the local path-metric values for the local links, wherein computing the packet-forwarding probability involves computing a metric-specific path weight for paths that traverse a local link and lead to the destination node, wherein the metric-specific path weight indicates the likelihood of the corresponding local link being chosen for forwarding packets to the destination node, wherein computing the metric-specific path weight involves computing a distribution of the local path-metric values for the metric using the following formula:

$$pw_{ij} \leftarrow \frac{\exp(pm_{ij}/T_j)}{\sum_{k=1}^{N}\exp(pm_{kj}/T_j)};$$

wherein
- i denotes the index of a local link;
- j denotes the index of a metric, if more than one metric is associated with a local link;
- $pw_{ij}$ denotes the metric-specific path weight for metric j and for paths traversing local link i;
- $pm_{ij}$ denotes the local path-metric value for metric j and for paths traversing local link i;
- $T_j$ denotes a pre-determined parameter associated with metric j; and
- N denotes the total number of local links; and forwarding a packet destined for the destination node to one of the local links based on the computed packet-forwarding probability for that local link.

2. The method of claim 1 wherein if a local link has more than one metric, the pre-determined parameter $T_j$ associated with metric j has a value of 1/N, wherein N denotes the total number of local links.

3. The method of claim 1, wherein if a local link has more than one metric, computing the packet-forwarding probability involves computing a link weight for a local link as follows:

$$w_i \leftarrow \sum_{j=1}^{M} Q_j \cdot pw_{ij};$$

wherein
- i denotes the index of a local link;
- j denotes the index of a metric;
- $w_i$ denotes the link weight for local link i;
- $pw_{ij}$ denotes the metric-specific path weight for metric j and for a path traversing local link i;
- $Q_j$ denotes the weight assigned to metric j for calculating the link weight; and
- M denotes the total number of metrics.

4. The method of claim 3, further comprising computing an average metric value associated with the destination node for a given metric and for the paths which lead to the destination node and which traverse the local links, as follows:

$$am_j \leftarrow \sum_{i=1}^{N} w_i \cdot pm_{ij};$$

wherein
- i denotes the index of a local link;
- j denotes the index of a metric;
- $am_j$ denotes the average metric value for metric j;
- $w_i$ denotes the link weight for local link i;
- $pm_{ij}$ denotes the local path-metric value for metric j and for paths traversing local link i and leading to the destination node; and
- N denotes the total number of local links.

5. The method of claim 4, further comprising communicating a rounded average metric value to a neighboring node.

6. The method of claim 5, wherein the communication of the rounded average metric value to the neighboring node occurs when the current rounded average metric value differs from a corresponding previously communicated value.

7. The method of claim 3, wherein forwarding the packet involves forwarding the packet to a local link i with a probability of $w_i$.

8. A computer-readable storage medium storing instructions that when executed by a computer cause the computer to perform a method for facilitating multi-path load balancing at a local node in a network, the method comprising:

measuring a value for a metric on a local link which couples the local node to a neighboring node;

receiving from the neighboring node a neighbor path-metric value which indicates a value for the metric associated with paths from the neighboring node to a destination node;

computing a local path-metric value for the metric associated with paths from the local node to the destination node via the local link and the neighboring node;

computing a packet-forwarding probability corresponding to the destination node for each local link coupled to the local node, wherein the distribution of the packet-forwarding probability bears a nonlinear relation to the distribution of the local path-metric values for the local links, wherein computing the packet-forwarding probability involves computing a metric-specific path weight for paths that traverse a local link and lead to the destination node; and wherein the metric-specific path weight indicates the likelihood of the corresponding local link being chosen for forwarding packets to the destination node, wherein computing the metric-specific path weight involves computing a distribution of the local path-metric values for the metric using the following formula:

$$pw_{ij} \leftarrow \frac{\exp(pm_{ij}/T_j)}{\sum_{k=1}^{N}\exp(pm_{kj}/T_j)};$$

wherein
- i denotes the index of a local link;
- j denotes the index of a metric, if more than one metric is associated with a local link;
- $pw_{ij}$ denotes the metric-specific path weight for metric j and for paths traversing local link i;
- $pm_{ij}$ denotes the local path-metric value for metric j and for paths traversing local link i;
- $T_j$ denotes a pre-determined parameter associated with metric j; and
- N denotes the total number of local links; and forwarding a packet destined for the destination node to one of the local links based on the computed packet-forwarding probability for that local link.

9. The computer-readable storage medium of claim 8, wherein if a local link has more than one metric, the pre-determined parameter $T_j$ associated with metric j has a value of 1/N, wherein N denotes the total number of local links.

10. The computer-readable storage medium of claim 8, wherein if a local link has more than one metric, computing the packet-forwarding probability involves computing a link weight for a local link as follows:

$$w_i \leftarrow \sum_{j=1}^{M} Q_j \cdot pw_{ij};$$

wherein
- i denotes the index of a local link;
- j denotes the index of a metric;
- $w_i$ denotes the link weight for local link i;
- $pw_{ij}$ denotes the metric-specific path weight for metric j and for a path traversing local link i;
- $Q_j$ denotes the weight assigned to metric j for calculating the link weight; and
- M denotes the total number of metrics.

11. The computer-readable storage medium of claim 10, further comprising computing an average metric value associated with the destination node for a given metric and for the paths which lead to the destination node and which traverse the local links, as follows:

$$am_j \leftarrow \sum_{i=1}^{N} w_i \cdot pm_{ij};$$

wherein
- i denotes the index of a local link;
- j denotes the index of a metric;
- $am_j$ denotes the average metric value for metric j;
- $w_i$ denotes the link weight for local link i;
- $pm_{ij}$ denotes the local path-metric value for metric j and for paths traversing local link i and leading to the destination node; and
- N denotes the total number of local links.

12. The computer-readable storage medium of claim 11, further comprising communicating a rounded average metric value to a neighboring node.

13. The computer-readable storage medium of claim 12, wherein the communication of the rounded average metric value to the neighboring node occurs when the current rounded average metric value differs from a corresponding previously communicated value.

14. The computer-readable storage medium of claim 10, wherein forwarding the packet involves forwarding the packet to a local link i with a probability of $w_i$.

15. An apparatus for facilitating multi-path load balancing at a local node in a network, the apparatus comprising:
- a metric-measurement mechanism configured to measure a value for a metric on a local link which couples the local node to a neighboring node;
- a receiving mechanism configured to receive from the neighboring node a neighbor path-metric value which indicates a value for the metric associated with paths from the neighboring node to a destination node;
- a computing mechanism configured to:
  - computing a local path-metric value for the metric associated with paths from the local node to the destination node via the local link and the neighboring node; and
  - to compute a packet-forwarding probability corresponding to the destination node for each local link coupled to the local node,
  - wherein the distribution of the packet-forwarding probability bears a nonlinear relation to the distribution of the local path-metric values for the local links
  - wherein computing the packet-forwarding probability involves computing a metric-specific path weight for paths that traverse a local link and lead to the destination node,
  - wherein the metric-specific path weight indicates the likelihood of the corresponding local link being chosen for forwarding packets to the destination node,
  - wherein computing the metric-specific path weight involves computing a distribution of the local path-metric values for the metric using the following formula:

$$pw_{ij} \leftarrow \frac{\exp(pm_{ij}/T_j)}{\sum_{k=1}^{N} \exp(pm_{kj}/T_j)};$$

wherein
- i denotes the index of a local link;
- j denotes the index of a metric, if more than one metric is associated with a local link;
- $pw_{ij}$ denotes the metric-specific path weight for metric j and for paths traversing local link i;
- $pm_{ij}$ denotes the local path-metric value for metric j and for paths traversing local link t
- $T_j$ denotes a pre-determined parameter associated with metric j; and
- N denotes the total number of local links; and
- a packet-forwarding mechanism configured to forward a packet destined for the destination node to one of the local links based on the computed packet-forwarding probability for that local link.

* * * * *